United States Patent
Yanagida

(10) Patent No.: US 6,683,148 B2
(45) Date of Patent: Jan. 27, 2004

(54) METHOD FOR PRODUCING ETHYLENE-VINYL ACETATE COPOLYMER AND SAPONIFIED PRODUCT THEREOF

(75) Inventor: Noboru Yanagida, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 129 days.

(21) Appl. No.: 09/873,244

(22) Filed: Jun. 5, 2001

(65) Prior Publication Data

US 2002/0026019 A1 Feb. 28, 2002

(30) Foreign Application Priority Data

Jun. 6, 2000 (JP) ........................................ 2000-169364

(51) Int. Cl.$^7$ ............................................ C08F 210/00
(52) U.S. Cl. .................... 526/348; 526/331; 526/348.8; 525/330.6
(58) Field of Search ...................... 525/330.6; 526/304, 526/331, 348, 348.8

(56) References Cited

U.S. PATENT DOCUMENTS

| | | | |
|---|---|---|---|
| 3,560,461 A | | 2/1971 | Yonezu et al. |
| 4,140,668 A | * | 2/1979 | Sumi et al. ............ 260/33.2 R |
| 4,636,551 A | * | 1/1987 | Okaya et al. ................. 525/60 |
| 4,746,700 A | | 5/1988 | Takida |
| 5,744,547 A | | 4/1998 | Moritani et al. |
| 2001/0056160 A1 | * | 12/2001 | Ninomiya et al. ....... 525/330.6 |
| 2002/0026007 A1 | * | 2/2002 | Yanagida et al. ............. 525/56 |

FOREIGN PATENT DOCUMENTS

| | | |
|---|---|---|
| GB | 917 811 | 2/1963 |
| GB | 1172967 | 12/1969 |
| JP | 29-420 | 1/1954 |
| JP | 43-14958 | 6/1968 |
| JP | 47-38558 | 9/1972 |
| JP | 61-197603 | 9/1986 |
| JP | 9-71620 | 3/1997 |
| JP | 11-140136 | 5/1999 |
| JP | 11-292929 | 10/1999 |

OTHER PUBLICATIONS

Encyclopedia of Polymer Science and Engineering, vol. 17, pp. 181–183, "Vinyl Alcohol Polymers", 1989.

* cited by examiner

Primary Examiner—Helen L. Pezzuto
(74) Attorney, Agent, or Firm—Oblon, Spivak, McClellamd, Maier & Neustadt, P.C.

(57) ABSTRACT

The present invention provides methods for producing an ethylene-vinyl acetate copolymer and a saponified product thereof, in which defective appearances at the time of molding (e.g. fish eye or coloring) can be inhibited while using a recovered solvent. In the present invention, a recovered alcohol-based solvent is supplied for reuse after decreasing the concentration of an aldehyde compound contained in the solvent. The concentration of an aldehyde compound can be decreased by acetalizing it with an acid such as a cation exchange resin. For example, the concentration of an aldehyde compound in the solvent is not more than 100 ppm, and the concentration of an acetal compound in the solvent is at least 0.1 ppm but not more than 10,000 ppm.

21 Claims, No Drawings

METHOD FOR PRODUCING ETHYLENE-VINYL ACETATE COPOLYMER AND SAPONIFIED PRODUCT THEREOF

FIELD OF THE INENTION

The present invention relates to methods for producing an ethylene-vinyl acetate copolymer and a saponified product thereof.

BACKGROUND OF THE INVENTION

Saponified ethylene-vinyl acetate copolymers (hereinafter referred to as "EVOH") are excellent in melt moldability, gas barrier properties, water resistance, oil resistance, anti-static property and mechanical strength, and are used as various types of packages in the form of a film, a sheet, a container or the like. In these packages, visible imperfections generated at the time of molding, e.g. coloration, fish eye, rough surface, etc., are significant problems that need to be addressed. Therefore, several improvements have been proposed in the process of producing EVOH (e.g. JP 43(1968)-14958B, JP 47(1972)-38558B, JP 61(1986)-197603A, JP 9(1997)-71620A and JP 11(1999)-140136A).

On the other hand, to reduce production cost, it is desirable to recover and reuse unreacted materials and solvents used in the process of producing EVOH. Particularly, in the production of EVOH on a commercial scale, it is highly desirable to reuse alcohol-based solvents such as methanol. However, recovered solvents contain impurities formed as by-products in the steps of copolymerization, saponification and purification. Thus, when copolymerization is carried out using recovered solvents, the above-mentioned imperfections are generated at the time of molding the EVOH, reducing the commercial value of the molded product as a packaging material.

DISCLOSURE OF THE INVENTION

Thus, there is a need for alternative methods for producing an ethylene-vinyl acetate copolymer and a saponified product thereof in which recovered solvents can be used without generating visible imperfections at the time of molding.

Surprisingly, the inventor has found that the presence of an aldehyde compound in the recovered solvents induces the above-mentioned imperfections.

Accordingly, viewed from one aspect the invention provides a method for producing an ethylene-vinyl acetate copolymer which comprises copolymerizing ethylene and vinyl acetate in an alcohol-based solvent, wherein at least a portion of the alcohol-based solvent is prior treated whereby to reduce the amount of any aldehyde compound.

In a further aspect the present invention provides a method for producing an ethylene-vinyl acetate copolymer, which includes copolymerizing ethylene and vinyl acetate in an alcohol-based solvent, wherein at least a portion of the alcohol-based solvent is treated in advance by making contact with an acid, preferably a solid acid. According to this method, the concentration of an aldehyde compound in the solvent can be decreased by making contact with the acid.

In the method of the invention, it is preferable that the alcohol-based solvent to be treated is recovered by separating a solvent used in a copolymerization of ethylene and vinyl acetate from products and unreacted raw materials. Thus, according to the present invention, a recovered solvent can be reused while preventing a reduction in the qualities of the final EVOH molded product.

Furthermore, in the method of the present invention, for example, an alcohol-based solvent having a concentration of an aldehyde compound of at least 1 ppm but not more than 500 ppm (ppm is based on weight throughout, unless otherwise stated) is treated with an acid. It is preferable that the alcohol-based solvent after treatment with an acid has a concentration of an aldehyde compound of not more than 100 ppm. To sufficiently inhibit generation of visible imperfections at the time of molding, it is preferable that the concentration of an aldehyde compound in the treated solvent is not more than 30 ppm, more preferably not more than 5 ppm.

In a yet further aspect the present invention provides a method for producing an ethylene-vinyl acetate copolymer, which includes copolymerizing ethylene and vinyl acetate in an alcohol-based solvent, wherein the alcohol-based solvent contains an acetal compound. In this method, a solvent in which an aldehyde compound is acetalized is used.

In this method, it is preferable that the alcohol-based solvent contains the acetal compound in a concentration of at least 0.1 ppm but not more than 10,000 ppm.

The present invention also provides a method for producing EVOH. This method includes saponifying an ethylene-vinyl acetate copolymer obtained by any of the above-described methods.

DESCRIPTION OF THE PREFERRED EMBODIMENT

In a preferred embodiment of the present invention, an aldehyde compound contained in a recovered alcohol-based solvent is acetalized by making contact with a solid acid.

As the solid acid, any acid which is substantially insoluble in the alcohol-based solvent and which has an acid center on the surface and can act as an acetalization catalyst may be used without particular limitation. As the solid acid, for example, metal oxides (e.g. $Al_2O_3$, $V_2O_5$), sulfates (e.g. $NiSO_4$, $CuSO_4$), phosphates (e.g. $AlPO_4$), chlorides (e.g. $AlCl_3$, $CuCl_3$) and the like may be used. Typical solid acid catalysts such as zeolite catalyst, silica-alumina catalyst and the like also may be used. Minerals such as montmorillonite also may be used. However, cation exchange resins are particularly suitable for carrying out the present invention on commercial scale.

Cation exchange resins function as insoluble solid acids, and various products suitable for treating a large amount of liquid and repeated use are commercially available. As the cation exchange resins, weak acid cation exchange resins may be used, but strong acid cation exchange resins are preferred.

The concentration of an aldehyde compound in an alcohol-based solvent used for copolymerization of ethylene and vinyl acetate has a great influence on the appearance characteristics of an EVOH molded product. When the concentration of an aldehyde compound present in the solvent is not more than 100 ppm, the appearance characteristics of the molded product is greatly improved.

Although the concentration of an aldehyde compound in the recovered alcohol-based solvent depends on the recovery method and other conditions for the recovery, it is approximately in the range of 150 to 500 ppm. By treating the recovered alcohol-based solvent in advance to such an extent that the concentration of an aldehyde compound is not more than 100 ppm, preferably not more than 30 ppm, more preferably not more than 5 ppm, copolymerization may be carried out using only the recovered solvent. Furthermore, when the concentration of an aldehyde compound in the recovered alcohol-based solvent is from 1 to 150 ppm, it is also preferable that the alcohol-based solvent is treated in advance such that the concentration of an aldehyde compound is decreased further. As described later, in the process of producing EVOH, an alcohol-based solvent such as methanol is also used to recover unreacted vinyl acetate. When this alcohol-based solvent for the recovery of vinyl acetate moreover is recovered together with the alcohol-based solvent from the copolymerization, and the entire recovered solvents are treated to decrease the content of aldehyde, solvents used at all stages of the copolymerization process (in copolymerization and separation stages) may be supplemented by the recovered and treated alcohol-based solvent.

As described above, in one embodiment of the present invention, acetalization with a solid acid is carried out as a treatment for decreasing the content of an aldehyde compound. However, the method of the present invention can also be effected by acetalizing an aldehyde compound using any means other than contacting with a solid acid. As a method for acetalization, for example, contacting with a liquid acid, e.g. an aqueous solution of an inorganic acid such as sulfuric acid, nitric acid or phosphoric acid; a carboxylic acid such as formic acid, acetic acid or oxalic acid; or a Lewis acid such as zinc chloride or aluminum chloride, may be employed.

An example of an aldehyde that is a problem in the production of an ethylene-vinyl acetate copolymer is acetaldehyde. When acetaldehyde is acetalized together with methanol, dimethyl acetal (acetaldehyde dimethyl acetal) is formed.

In the following, preferred examples are described for the steps of producing and saponifying an ethylene-vinyl acetate copolymer and recovering and treating a solvent.

For the copolymerization of ethylene and vinyl acetate, any of solution polymerization, suspension polymerization, emulsion polymerization and bulk polymerization may be used, but solution polymerization is preferred. A method of either continuous type or batch type may be employed.

As the alcohol-based solvent, alcohols having 1 to 4 carbon atoms such as methanol, ethanol, n-butanol and t-butanol are suitable, and methanol is particularly suitable. A mixture solvent of two or more alcohols also may be used. As long as the alcohol-based solvent includes an alcohol as a main component, it may also include other minor components. Typically, the solvent will comprise at least 60% by wt., e.g. at least 70% by wt., alcohol.

As a catalyst, any radical initiator may be used without particular limitation. Preferred catalysts are azonitrile-based initiators such as 2,2'-azobisisobutyronitrile, 2,2'-azobis-(2,4-dimethylvaleronitrile), 2,2'-azobis-(4-methyl-2,4-dimethylvaleronitrile), 2,2'-azobis-(4-methoxy-2,4-dimethylvaleronitrile) and 2,2'-azobis-(2-cyclopropylpropionitrile); and organic peroxide-based initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Monomers copolymerizable with ethylene and vinyl acetate also may be present together with ethylene and vinyl acetate. Such monomers include (i) α-olefins such as propylene, isobutylene, α-octene and α-dodecene; (ii) unsaturated acids such as acrylic acid, methacrylic acid, crotonic acid, maleic acid and itaconic acid, salts thereof, and anhydrides or mono- or dialkyl esters thereof; (iii) nitriles such as acrylonitrile and methacrylonitrile; (iv) amides such as acrylamide and methacrylamide; (v) olefin sulfonic acids such as ethylene sulfonic acid, allyl sulfonic acid and methallyl sulfonic acid, or salts thereof. Other monomers such as alkyl vinyl ethers, vinyl ketone, N-vinylpyrrolidone, vinyl chloride, vinylidene chloride and the like also may be present. However, it is preferable that these third monomers are added to such an extent that the effects of the present invention are not inhibited.

It is preferable that the ethylene content in the copolymer is at least 20 mol % but not more than 70 mol %. When the ethylene content is too low, sufficient water resistance cannot be obtained. Conversely, when the ethylene content is too high, sufficient gas barrier properties cannot be obtained. From these viewpoints, it is more preferable that the ethylene content is from 25 to 60 mol %. Moreover, when the copolymer is used as a coating material or the like, the ethylene content may be less than 20 mol %.

It is preferable that the polymerization temperature is at least 50° C. but not more than 80° C., and the pressure of the gaseous phase (ethylene pressure) in the polymerization vessel is from 1962 to 7848 kPa (from 20 to 80 kg/cm$^2$). In the case of batch type polymerization, it is preferable that the reaction time is from 3 to 24 hours. In the case of continuous type polymerization, it is also preferable that the average residence time is in about the same range. It is preferable that the polymerization degree is about 30 to 80%, based on vinyl acetate.

Next, a polymerization inhibitor is added to a liquid containing an ethylene-vinyl acetate copolymer (copolymer solution), and unreacted ethylene gas is evaporated and removed from the copolymer solution. Further, unreacted vinyl acetate is removed from the copolymer solution. The vinyl acetate can be removed, for example, by continuously feeding the copolymer solution into a column (tower type device), filled with Raschig ring, through an upper portion thereof at a predetermined rate, and blowing a vapor of an alcohol-based solvent continuously into the column through a lower portion thereof. As the solvent to be blown into the column, the above exemplified alcohols as solvents, particularly methanol, are suitable. By extracting vinyl acetate using such a recovery column, unreacted vinyl acetate can be taken out of the column through a top portion thereof with the vapor of the alcohol-based solvent, and a copolymer solution from which unreacted vinyl acetate is removed can be obtained through a bottom portion of the column.

The mixture solution taken out of the column through a top portion thereof comprises the alcohol-based solvent contained in the copolymer solution, unreacted vinyl acetate and the alcohol-based solvent blown in the column. This mixture solution is introduced into another recovery column, and vinyl acetate is separated from the mixture solution by extractive distillation with water (this vinyl acetate also can be reused), and it is taken out of the column as a mixture solution of alcohol and water. Furthermore, by separating and purifying this water/alcohol mixture solution, an alcohol-based solvent can be recovered.

As described above, because the recovered alcohol-based solvent contains an aldehyde compound, this aldehyde compound is preferably acetalized. When acetalization is carried out with a cation exchange resin, for example, an alcohol-based solvent is put into a column filled with beaded cation exchange resin and allowed to pass through the column. In this case, the temperature in the column is not particularly limited as long as it is in such a range that the alcohol-based solvent is liquid, and usually a temperature around room temperature may be employed. Furthermore, from the viewpoint of the efficiency of the solvent treatment, it is preferable that the residence time of the alcohol-based solvent in the column is from 1 to 30 minutes. The recovered and treated solvent thus obtained is reused as a solvent in the above-mentioned copolymerization.

On the other hand, an alkali catalyst is added to the copolymer solution from which unreacted vinyl acetate is removed, and an acetic acid ester component of the ethylene-vinyl acetate copolymer is saponified. The saponification may be carried out by a method of either continuous type or batch type. As the alkali catalyst, sodium hydroxide, potassium hydroxide, alkaline metal alcoholate or the like may be used. For example, when the saponification is carried out by a method of batch type, it is preferable that the temperature of the copolymer solution is at least 30° C. but not more than 65° C., and the reaction time is from 1 to 6 hours. It is preferable that the concentration of the copolymer solution is from 10 to 50%, and the amount of the catalyst used is from 0.02 to 1.0 equivalent with respect to an acetic acid ester component (with respect to acetic acid group). Because the obtained saponified product (EVOH) contains an alkali catalyst, by-product salts and other impurities, these are neutralized and washed as needed.

It is preferable that the saponification degree of the EVOH is at least 95 mol %, more preferably at least 99 mol %. When the degree of saponification is insufficient, sufficient gas barrier properties may not be obtained. Moreover, for example, in order to improve the interlayer adhesiveness or the like, the saponification degree also may be about 80 to 95 mol %. The EVOH with this saponification degree may be used alone, but it also may be used as a blend with an EVOH having a saponification degree of at least 99 mol %.

It is preferable that the melt index (MI) of the EVOH is from 0.1 to 200 g/10 min. As the MI, a measured value at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with an inverse number of an absolute temperature on the horizontal axis and MI on the vertical axis (logarithmic scale), and a value extrapolated at 190° C. is used as the MI.

The EVOH thus obtained may be molded into various forms such as films, sheets, containers, pipes, fibers and the like by melt molding. Melt molding may be effected by extrusion molding, inflation, blow molding, melt spinning, injection molding and the like. It is preferable that the melting temperature is from 150 to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH prior to molding.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

As described above, the method of the present invention is particularly suitable for copolymerizing ethylene and vinyl acetate continuously, wherein an alcohol-based solvent is recovered and the solvent is further treated and reused as a solvent in the copolymerization, and in which an EVOH is produced from the obtained copolymer. Viewed from a yet further aspect the invention thus provides a method for continuously producing an ethylene-vinyl acetate copolymer, said method comprising the following steps: (a) copolymerizing ethylene and vinyl acetate in an alcohol-based solvent whereby to produce an ethylene-vinyl acetate copolymer; (b) recovering at least a portion of said alcohol-based solvent; (c) treating the recovered solvent whereby to reduce the amount of any aldehyde compound; (d) repeating step (a) using at least a portion of the solvent obtained in step (c); and (e) optionally repeating steps (b) to (d). The above-described embodiment includes copolymerizing ethylene and vinyl acetate in an alcohol-based solvent thereby to obtain an ethylene-vinyl acetate copolymer; recovering unreacted vinyl acetate by supplying additional alcohol-based solvent to the alcohol-based solvent containing the copolymer; separating vinyl acetate from the recovered alcohol-based solvent; and acetalizing an aldehyde compound contained in the alcohol-based solvent from which vinyl acetate is separated. Furthermore, it is preferable that solvent used at all stages in the process of producing an ethylene-vinyl acetate copolymer is supplemented by the recovered and treated alcohol-based solvent.

It is to be noted that the above-described embodiment is merely one example of the present invention. The present invention can be applied, for example, to the case of using an alcohol-based solvent, in which an aldehyde compound is present, as an initial raw material. The present invention also can be applied, for example, to an embodiment in which ethylene and vinyl acetate are copolymerized in an alcohol-based solvent to produce an ethylene-vinyl acetate copolymer, wherein the concentration of an aldehyde compound in the alcohol-based solvent is not more than 100 ppm, and the concentration of an acetal compound in the alcohol-based solvent is at least 0.1 ppm but not more than 10,000 ppm.

EXAMPLES

The present invention will be described in more detail with reference to the following non-limiting examples.

Example

Using a polymerization vessel with an agitator having a capacity of 100 L and including a cooling coil within the vessel, continuous copolymerization of an ethylene-vinyl acetate copolymer was carried out under the following conditions:

| | |
|---|---|
| Feed rate of vinyl acetate: | 5.0 kg/hour |
| Initiator: | 2,2'-azobis(2,4-dimethylvaleronitrile) |
| Feed rate of initiator | 0.3 L/hour (as a methanol solution of 2.8 g/L |
| Polymerization temperature: | 60° C. |
| Ethylene pressure in the polymerization vessel: | 4414.5 kPa (45 kg/cm$^2$) |
| Average residence time: | 7 hours |
| Solvent: | Methanol recovered and treated by a method in accordance with the invention (the details are described later) |

A polymerization reaction liquid (copolymer solution) drawn from the polymerization vessel continuously through a bottom portion thereof is sampled, and its composition is analyzed. The results are shown below.

| | |
|---|---|
| Ethylene-vinyl acetate copolymer (ethylene content of 34 mol %): | 46 wt % |
| Vinyl acetate: | 32 wt % |
| Ethylene: | 8.7 wt % |
| Methanol: | 10 wt % |
| Others: | 3.3 wt % |

The polymerization degree of vinyl acetate was 55%.

After adding β-myrcene to the copolymer solution as a polymerization inhibitor, ethylene was flash evaporated and removed from the copolymer solution. Furthermore, the copolymer solution from which ethylene was removed was introduced into a recovery column (plate tower) through an upper portion thereof, while a vapor of methanol was blown into the column through a lower portion thereof. Unreacted vinyl acetate was taken out of the column through a top portion thereof together with a portion of methanol. On the other hand, a methanol solution of an ethylene-vinyl acetate copolymer was taken out of the column through a bottom portion thereof. The composition of the mixture solution taken out of the column through a top portion thereof was: 60 wt % of vinyl acetate and 40 wt % of methanol. Furthermore, the concentration of the copolymer in the methanol solution taken out of the column through a bottom portion thereof was 45 wt %.

From the mixture solution taken out of the column through a top portion thereof, methanol was recovered by the method as follows:

First, this solution was introduced into another recovery column (plate tower) and subjected to extractive distillation with water. Thereby, a mixture solution of methanol and water was taken out of the column through a lower portion thereof. The weight ratio of methanol and water in this mixture solution was 30:70. Next, this water/methanol mixture solution was separated and purified in another recovery column, and methanol was recovered.

Furthermore, this recovered methanol was treated with a cation exchange resin. Specifically, the recovered methanol was put into a vessel continuously at a rate of 1.0 kg/hour to be treated. The vessel (10L) was filled with an H$^+$ type strong-acid cation exchanger (manufactured by The Dow Chemical Company: "DOWEX G25").

Thus, a recovered and treated methanol was obtained. The concentrations of aldehyde and acetal in this treated methanol were measured by gas chromatography (detector: FID). As a result, the concentration of an acetal compound (mainly dimethyl acetal) was 380 ppm. Furthermore, no aldehyde compound (mainly, acetaldehyde is assumed) was detected.

When the same concentration measurements were made for the recovered methanol before being treated with a cation exchange resin, the concentration of an aldehyde compound (mainly acetaldehyde) was 200 ppm. No acetal compound was detected.

The treated methanol obtained and unused methanol were mixed at a weight ratio of 9:1. Using this mixture solution as a solvent, the above-described continuous copolymerization for an ethylene-vinyl acetate copolymer was further carried out continuously. Thus, while recovering and treating methanol and reusing it as a solvent, the above-described series of steps was carried out continuously, and a methanol solution of a copolymer was produced continuously.

This ethylene-vinyl acetate copolymer was saponified, and further melt molded according to the following steps.

First, 1 weight part of sodium hydroxide was added to 100 weight parts of the methanol solution, and the copolymer was saponified while blowing a vapor of methanol into the methanol solution such that it was at 110° C. and 343.4 kPa (3.5 kg/cm$^2$). Methyl acetate formed as a by-product was distilled together with a portion of methanol, and excluded out of the system. Into the solution of a saponified product (EVOH) thus obtained, a vapor of water/methanol was further blown so as to distill the solvent, and an EVOH solution (methanol/water=65/35; weight ratio) having a polymer concentration of 35 wt % was obtained.

Next, this EVOH solution was discharged into a coagulation liquid (methanol/water=10/90; weight ratio) at 5° C. through a die with apertures of 2 mm in diameter, and coagulated in the form of strands. The strands were cut by a cutter so as to obtain pellets with a length of 2.5 to 3.5 mm. These pellets were washed with 15 weight parts of water with respect to 1 weight part of the pellets, and deliquored. Furthermore, the washed pellets were treated with an aqueous solution of acetic acid and sodium dihydrogenphosphate, deliquored and dried. Thus, EVOH pellets having a saponification degree of 99.5 mol % and a MI of 2.1 g/10 min (load of 2160 g, temperature of 190° C.) were obtained.

These EVOH pellets were formed into a film by the method described below, and a single-layer film having a thickness of 30 μm was obtained.

| | |
|---|---|
| Type: | Single screw extruder (non-vent type) |
| L/D: | 20 |
| Bore diameter: | 60 mm φ |
| Screw: | Single-start full-flight type, nitrided surface steel |
| Rotation of screw: | 40 rpm |
| Die: | Coat hanger die of 300 mm in width |
| Gap between lips: | 0.3 mm |
| Temperature setting for cylinders (C1 to C3) and die: | C1/C2/C3/die; 195/230/230/230 (° C.) |

The fish eyes (those of about 150 μm or more that can be confirmed with the naked eye) in a film after one hour from the start of the film formation were counted. Converting to a number per 1.0 m$^2$, less than 10 fish eyes/m$^2$ were generated. Furthermore, an end face of a wound-up film was observed to be colorless.

Comparative Example

Using a recovered methanol that was not treated with a cation exchange resin as a solvent, the steps of polymerization, saponification, pelletization and film formation were carried out in the same manner as in the above Example, and a single-layer film having a thickness of 30 μm was obtained.

When fish eyes were counted in the same manner as in Example, converting to a number per 1.0 m$^2$, about 150 fish eyes/m$^2$ were generated. Furthermore, an end face of a wound-up film was observed to be colored yellow.

As described above in detail, according to the present invention, defective appearances of a molded product as a final product can be inhibited even when using a recovered alcohol-based solvent as a solvent for copolymerization. The present invention that realizes not only a reduction in the production cost but also effective use of resources while maintaining the qualities of the product has a large utility value in this technical field.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing an ethylene-vinyl acetate copolymer which comprises copolymerizing ethylene and vinyl acetate in an alcohol-based solvent, wherein at least a portion of the alcohol-based solvent is prior treated to reduce the amount of any aldehyde compound to not more than 100 ppm.

2. A method as claimed in claim 1, wherein the concentration of aldehyde is not more than 30 ppm.

3. A method as claimed in claim 1, wherein at least a portion of the alcohol-based solvent is contacted with a solid acid whereby to reduce the amount of any aldehyde compound.

4. A method as claimed in 3, wherein said solid acid is a cation exchange resin.

5. A method as claimed in claim 1, wherein the alcohol-based solvent before treated has a concentration of an aldehyde compound of at least 1 ppm but not more than 500 ppm.

6. A method as claimed in claim 5, wherein the alcohol-based solvent before treated has a concentration of an aldehyde compound of at least 150 ppm but not more than 500 ppm.

7. A method as claimed in claim 1, wherein said alcohol-based solvent contains an acetal compound.

8. A method as claimed in claim 7, wherein said alcohol-based solvent contains the acetal compound in a concentration of from 0.1 ppm to 10,000 ppm.

9. A method as claimed in claim 1, wherein the alcohol-based solvent to be treated is recovered from a process of producing an ethylene-vinyl acetate copolymer.

10. A method for producing an ethylene-vinyl acetate copolymer which comprises copolymerizing ethylene and vinyl acetate in an alcohol-based solvent, wherein at least a portion of the alcohol-based solvent is prior treated by making contact with a solid acid.

11. A method as claimed in claim 10, wherein said alcohol-based solvent is prior treated whereby to reduce the concentration of aldehyde to not more than 100 ppm.

12. A method as claimed in claim 11, wherein the concentration of aldehyde is not more than 30 ppm.

13. A method as claimed in claim 10, wherein said solid acid is a cation exchange resin.

14. A method as claimed in claim 10, wherein the alcohol-based solvent before treated has a concentration of an aldehyde compound of at least 1 ppm but not more than 500 ppm.

15. A method as claimed in claim 14, wherein the alcohol-based solvent before treated has a concentration of an aldehyde compound of at least 150 ppm but not more than 500 ppm.

16. A method as claimed in claim 10, wherein said alcohol-based solvent contains an acetal compound.

17. A method as claimed in claim 10, wherein the alcohol-based solvent to be treated is recovered from a process of producing an ethylene-vinyl acetate copolymer.

18. A method for continuously producing an ethylene-vinyl acetate copolymer, said method comprising the following steps:
   (a) copolymerizing ethylene and vinyl acetate in an alcohol-based solvent whereby to produce an ethylene-vinyl acetate copolymer;
   (b) recovering at least a portion of said alcohol-based solvent;
   (c) treating the recovered solvent whereby to reduce the amount of any aldehyde compound;
   (d) repeating step (a) using at least a portion of the solvent obtained in step (c); and
   (e) optionally repeating steps (b) to (d).

19. A method for producing a saponified ethylene-vinyl acetate copolymer which comprises saponifying an ethylene-vinyl acetate copolymer obtained by a method as claimed in claim 1.

20. A method for producing a saponified ethylene-vinyl acetate copolymer which comprises saponifying an ethylene-vinyl acetate copolymer obtained by a method as claimed in claim 10.

21. A method for producing a saponified ethylene-vinyl acetate copolymer which comprises saponifying an ethylene-vinyl acetate copolymer obtained by a method as claimed in claim 18.

* * * * *